UNITED STATES PATENT OFFICE.

CHARLES W. HICKS, OF SUTHERLAND, FLORIDA.

INSECTICIDE.

No. 907,498.      Specification of Letters Patent.      Patented Dec. 22, 1908.

Application filed September 12, 1908. Serial No. 452,735.

*To all whom it may concern:*

Be it known that I, CHARLES W. HICKS, a citizen of the United States, residing at Sutherland, in the county of Hillsboro and State of Florida, have invented certain new and useful Improvements in Insecticides, of which the following is a specification.

My invention relates to an improvement in an insecticide consisting of a composition of matter for destroying insects on fruit trees, and for removing the scale formed on the trees by such insects known as the white fly. The citrus tree and fruit trees of all kinds are affected by these insects. The fly known as the white fly is considered the most dangerous, as it attacks the trees, making them perfectly black, which is quickly followed by a scale. The tree soon loses its foliage, and dies from the effect of the scale formation.

In my composition, I use the following ingredients:—whale oil soap, two quarts, wood creosote, one quart, spirits of turpentine one quart, borax dissolved in the turpentine, one pound. These ingredients are thoroughly commingled, and then diluted in from fifty to sixty-five gallons of water, when it is ready for spraying upon the trees. The borax may be commingled with the other ingredients without being dissolved in turpentine, if it is so desired.

The fish or whale oil soap is preferred as I have found in using the composition that the best results can be obtained, although the ordinary bar soap may be used.

The creosote and soap may be used alone, but the best results are obtained in using the entire formula as specified.

With this composition of matter the scale will be removed from the trees, and the insects killed, and it will also destroy the white fly, and eggs, as well as placing the trees in a healthy, growing condition. It is a simple means whereby these insects which are a pest to all fruit growers can be destroyed. The white flies cover the leaves of the trees with some black substance, which causes the scale, and in a very short time kills the tree, but with this composition I am enabled to rid the tree of these insects.

I do not care to be limited to the exact formula herein stated, nor to the proportions as given, but to arrange the different ingredients in the proportions to obtain the best results.

Having fully described my invention, what I claim as new and desire to secure by Letters Patent, is:—

1. The herein described composition of matter consisting of soap, creosote, borax and spirits of turpentine.

2. The herein described composition of matter consisting of water, soap, creosote, spirits of turpentine, and borax, substantially as described, and for the purpose specified.

In testimony whereof I affix my signature in presence of two witnesses.

CHARLES W. HICKS.

Witnesses:
    J. M. RHEA,
    C. J. HICKS.